Figure 1:
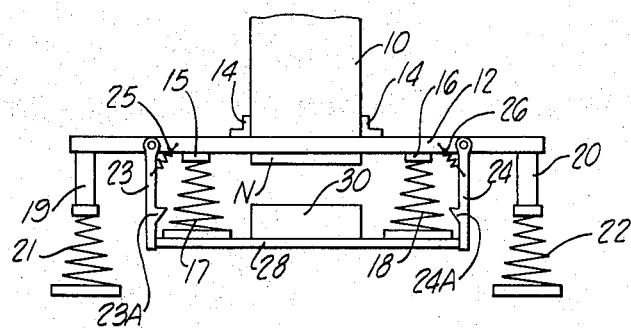

United States Patent [19]

Hadjisky

[11] 3,775,716

[45] Nov. 27, 1973

[54] MAGNETIC ASSEMBLY HAVING LATCHING MEANS STORING ENERGY TO PRODUCE USEFUL WORK

[75] Inventor: John Hadjisky, Sofia, Bulgaria
[73] Assignee: Joann Stoyanova, Pasadena, Calif.
[22] Filed: Nov. 10, 1972
[21] Appl. No.: 305,613

[52] U.S. Cl. .............................. 335/253, 335/170
[51] Int. Cl. .............................................. H01f 7/08
[58] Field of Search ....................... 335/170, 253, 254

[56] References Cited
UNITED STATES PATENTS
1,449,212   3/1923   Berry ............................. 335/170 X Primary Examiner—George Harris
Attorney—Charles G. Lyon et al.

[57] ABSTRACT

A magnetic device includes a means for producing a magnetic field associated with a first armature and a second armature each of which is associated with a corresponding helix volute spring that is compressed when the corresponding armature is magnetically attracted. The magnetic force developed between the first magnet and such means is only slightly greater than the force than being exerted by its then compressed volute spring. The second armature in its attracted position lessens the attractive force between the first armature and such means sufficiently below that force exerted by its volute spring such that the energy previously stored in such volute springs may be effective to propel the first armature together with the second armature away from such means.

9 Claims, 4 Drawing Figures

PATENTED NOV 27 1973  3,775,716

MAGNETIC ASSEMBLY HAVING LATCHING MEANS STORING ENERGY TO PRODUCE USEFUL WORK

The present invention relates to improved means and techniques for using magnetic energy.

An object of the present invention is to provide means and teachings particularly useful in magnetic devices.

Another object of the present invention is to provide an improved device in which magnetic energy may be first transformed into stored energy in a spring and then released to produce useful work.

Another object of the present invention is to provide an improved device in which energy derived from a magnetic structure may be used to propel an object.

The features of the present invention which are believed to be novel are set forth with particularity in the appended claims. This invention itself, both as to its organization and manner of operation, together with further objects and advantages thereof, may be best understood by reference to the following description taken in connection with the accompanyings which:

FIGS. 1 – 4 illustrate various positions and conditions of elements in a magnetic device embodying features of the present invention.

The magnetic device includes a means 10 for producing a magnetic field as for example a permanent magnet or an electromagnet mounted on a structure 12 which for purposes of illustration and explanation may be considered stationary and in the form of for example a non-magnetizeable apertured plate on which the magnet 10 is secured by brackets 14 with the end of such magnetic means 10 extending therethrough and providing a magnetic pole as for example a north pole N.

Extending downwardly from plate 12 are a first pair of abutments 15, 16 which provide seats for the smaller end of corresponding volute helix compression springs 17, 18; and a second pair of longer abutments 19, 20 which provide seats for the smaller end of corresponding volute helix compression springs 21, 22.

Pivotally mounted on the mounting plate 12 is a pair of latching elements 23, 24 having hooked portions 23A, 24A which are spring urged towards each other by corresponding tension springs 25, 26.

The other lower end of each of springs 17, 18 are adapted to bear against a plate 28 which may be of non-magnetizeable material and which mounts an armature 30 of magnetizeable material.

The other lower end of each of springs 21, 22 is adapted to bear against a plate 34 which may be of non-magnetizeable material and which mounts an armature 36 of magnetizeable material.

Figure 2:
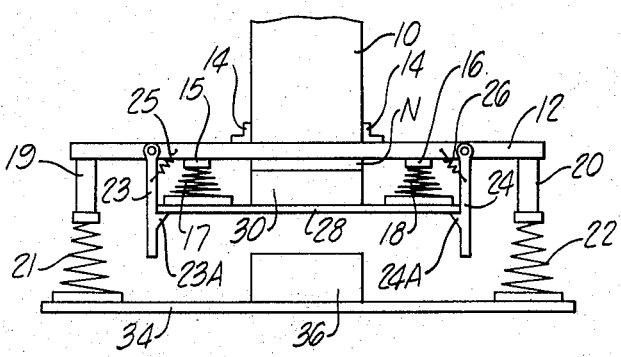

In operation of the device initially the armature 30 is positioned by means not shown as illustrated in FIG. 1 within the magnetic field produced by magnetic means 10 which causes a magnetic attraction of sufficient strength to move the armature 30 upward into its position shown in FIG. 2. During such movement the springs 17, 18 are progressively compressed and the ends of plate 28 ride over the hooked portions 23A, 24A which are urged by springs 25, 26 into latching position or engagement as shown in FIG. 2. In the position shown in FIG. 2 the attractive force acting on armature 30 is sufficiently large to maintain the armature in such attracted position i.e., in that condition shown in FIG. 2 the attractive force is somewhat larger than that force produced by springs 21, 22.

Figure 3:
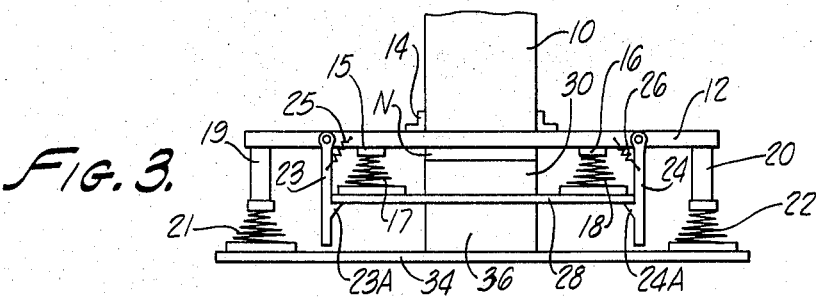

The next step involves positioning, by means not shown which however can be accomplished manually, the armature 36 within the magnetic field produced by magnetic means 10 such that the magnetic attractive forces acting on armature 36 cause it to move upwardly into the position shown in FIG. 3 against the action of springs 21, 22 which are compressed as shown in FIG. 3.

Figure 4:
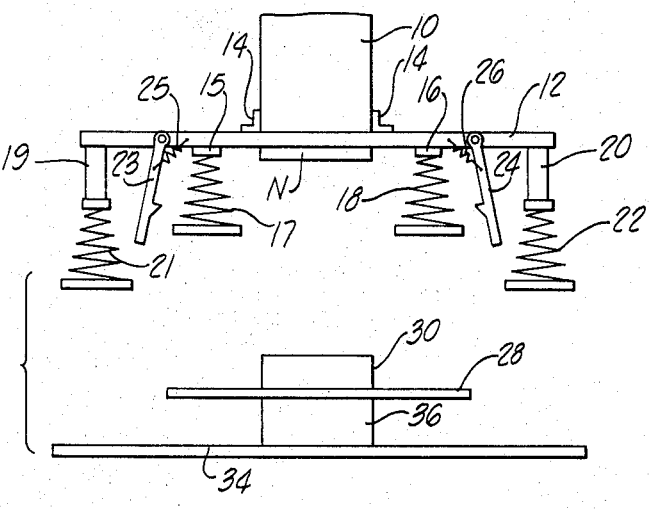

In FIG. 3 the magnetic attractive forces between armature 30 and magnetic means 10 is lessened sufficiently by the then proximity of armature 36 to armature 30 and magnetic means 10 such that in the condition shown in FIG. 3 the force exerted by springs 17, 18 are now larger than the attractive force between means 10 and armature 30 so that when, as shown in FIG. 4 the latch arms 23, 24 are moved apart by means not shown but which may be accomplished manually the force of spring 17, 18 and 21, 22 cause the armatures 30, 36 to be propelled with great velocity as a result of the release of the energy previously stored in springs.

For these purposes the use of volute type springs instead of a linear type such as a cylindrical type is preferred. A volute type spring has a force-distance characteristic which is non-linear because the force necessary to compress the same increases more than in direct proportion to the distance between the ends of the spring. Likewise in a magnetic structure of the character described the attractive force between the armature 30 and magnetic means 10 increases more than in direct proportion the smaller their distance of separation. It is considered important that there be a substantial match between on the one hand the non-linear force-distance characteristic curve of the springs used and on the other hand the non-linear force-distance characteristic curve of the magnetic structure.

Following these teaching it is then possible as described above to effect a change in condition from FIG. 2 to FIG. 3 wherein in the former case in FIG. 2 the magnetic attraction force between means 10 and armature 30 is slightly greater than the force exerted by the compressed springs 17, 18, to the condition in FIG. 3 where the opposite is true, i.e., the magnetic force between armature 30 and means 10 is somewhat less than that force produced by springs 17, 18 in which case the force of spring 17, 18 are greater than the attractive forces between on the one hand the magnetic means 10 and on the other hand the armatures 30, 36 considered jointly.

Preferably also in FIG. 3 the magnetic attractive force between armature 36 and magnet 10 is only slightly greater than the sum of the forces developed in springs 21, 22 so that the armature 36 remains in its attracted position shown in FIG. 3 preparatory to releasing the latching means 23, 24.

While the particular embodiments of the present invention have been shown and described, it will be obvious to those skilled in the art that changes and modifications may be made without departing from the invention in its broader aspects and, therefore, the aim in the appended claims is to cover all such changes and modifications as fall within the true spirit and scope of this invention.

I claim:

1. In combination; meins producing a magnetic field; first armature means; first spring means acting between said first armature means and said field producing means which is stressed when and as said first armature means is attracted and is moved by said field producing means to an attracted portion; second armature means attracted by and moved by said field producing means to an attracted position; the force of attraction beween said first armature means and said field producing means in the attracted position of said first armature means being greater than the force exerted by said first spring means; said second armature means in its attracted position causing said force of attraction beween said first armature means and said field producing means to be less than the force exerted by said first spring means.

2. The combination as set forth in claim 1 including means effective in said attracted position of said first armature for preventing movement of said first armature means by said first spring means.

3. The combination as set forth in claim 2 in which said preventing means comprises self latching means which is operated in movement of said first armature means to its attracted position.

4. The combination as set forth in claim 1 in which said spring means is a helix volute spring.

5. The combination as set forth in claim 4, a second helix volute spring means, said second armature means compressing said second spring means when and as said second armature means is moved to its attracted position.

6. The combination as set forth in claim 5 including means for preventing movement of said first armature means from its attracted position during movement of said second armature means to its attracted position.

7. The combination as set forth in claim 6 in which said preventing means is a self latching means operated by said first armature means in its travel to its attracted position.

8. The combination as set forth in claim 7 in which each of said volute springs have a force-distance characteristic curve substantially matching the force-distance characteristic of the corresponding armature means.

9. The combination as set forth in claim 8 in which said first armature means in its attracted position is closer to said field producing means than is said second armature means in its attracted position.

* * * * *